United States Patent [19]

Withers

[11] Patent Number: 5,746,891

[45] Date of Patent: May 5, 1998

[54] WEAR INDICATORS FOR SEAL STRIP OF A SUCTION ROLL OF A PAPER MAKING MACHINE

[76] Inventor: William David Withers, 79 Brighton Rd., Atlanta, Ga. 30309

[21] Appl. No.: 686,252

[22] Filed: Jul. 25, 1996

[51] Int. Cl.⁶ ........................................... D21F 3/10
[52] U.S. Cl. ...................... 162/371; 162/369; 277/2
[58] Field of Search ............................. 162/369, 371, 162/272; 277/2

[56] References Cited

U.S. PATENT DOCUMENTS

| | | | |
|---|---|---|---|
| 3,230,138 | 1/1966 | Berges | 162/307 |
| 3,465,550 | 9/1969 | Strom et al. | 68/13 |
| 3,846,231 | 11/1974 | Crosby et al. | 162/263 |
| 3,989,085 | 11/1976 | Crosby | 162/198 |
| 4,329,201 | 5/1982 | Bolton | 162/198 |
| 4,418,920 | 12/1983 | Belter | 277/50 |
| 4,474,217 | 10/1984 | DeMarse et al. | 138/137 |
| 4,714,523 | 12/1987 | Sawyer, Jr. et al. | 162/371 |
| 5,240,564 | 8/1993 | Niskanen et al. | 162/358 |
| 5,246,235 | 9/1993 | Heinzen | 277/2 |
| 5,485,653 | 1/1996 | Knowlton et al. | 15/340.4 |

FOREIGN PATENT DOCUMENTS

| | | | |
|---|---|---|---|
| 204374 | 12/1982 | Japan | 277/2 |
| 2015389 | 6/1994 | Russian Federation | 277/2 |

OTHER PUBLICATIONS

SealPak—Custom Fitted Suction Roll Packing Material (one sheet, two sides) by Voith Sulzer.
Robaseal Sealing Strips (one sheet, two sides) by Fox International Corporation, U.S.A.
Robaseal Sealing Strips, 4 page brochure, by Leripa Kunststoff GmbH + Co. KG.

*Primary Examiner*—Karen M. Hastings
*Attorney, Agent, or Firm*—Thomas, Kayden, Horstemeyer & Risley

[57] ABSTRACT

Wear indicators (80) are formed in the seal strips (52, 54) of a suction box (44) of a suction roll assembly (15) of a papermill. The wear indicators include a space such as a bore (74) formed in the seal strip, extending through the arcuate seal surface (68, 70), and extending inwardly of the seal strip. The bores are filled with colored fill material, with red fill material (81) located deep in the bore, yellow fill material (82) placed on top of the red fill material, and green fill material (83) placed on top of the yellow fill material and reaching the seal surface of the seal strip. As the seal strip wears during the operation of the papermill, the colored fill material will be visible upon inspection of the seal strips, informing the inspector of how much farther the seal strips can be urged outwardly into engagement with the suction roll (22) in response to inflation of the inflatable biasing tubes (56, 58 and 60).

8 Claims, 4 Drawing Sheets

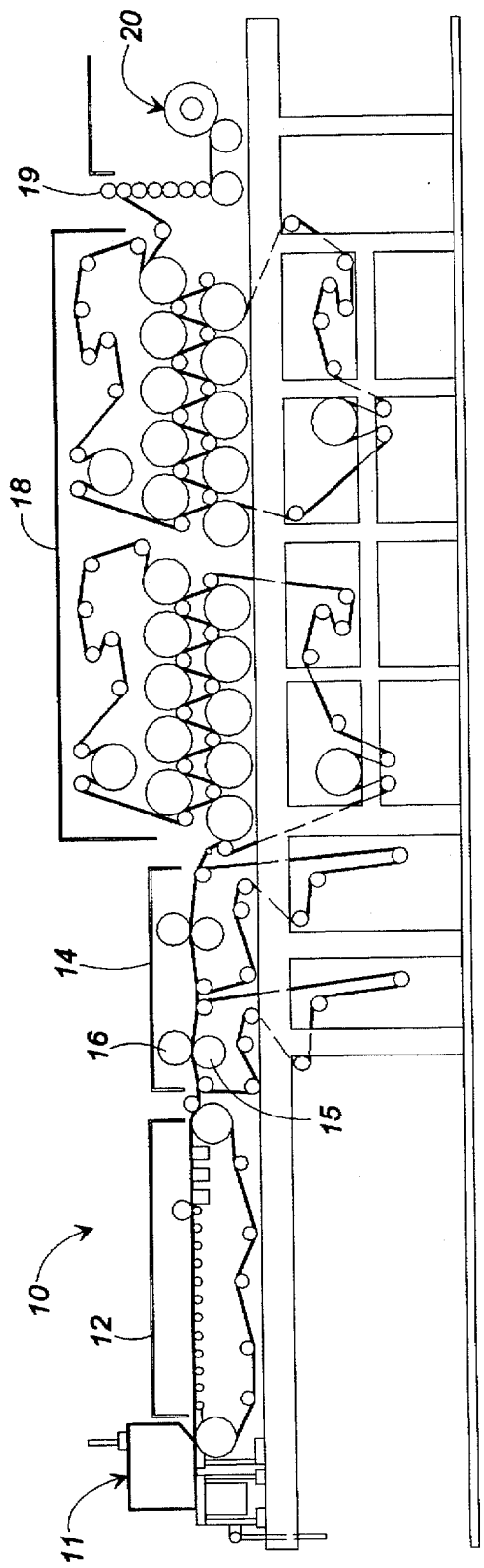
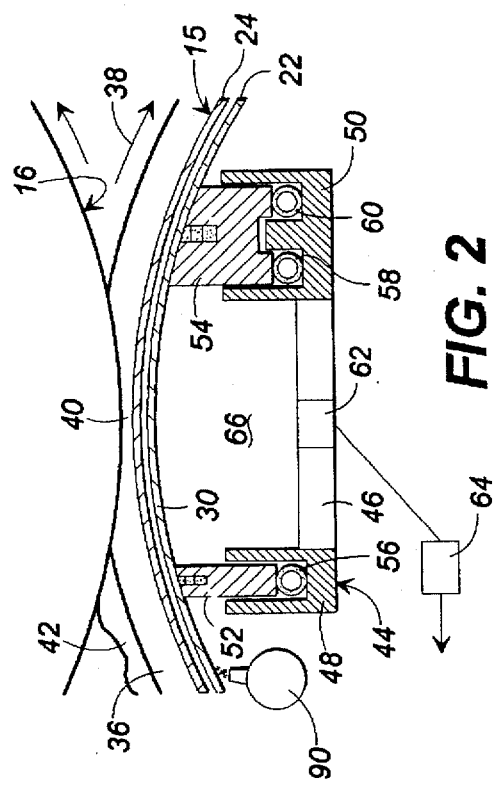
FIG. 1
FIG. 2

WEAR INDICATORS FOR SEAL STRIP OF A SUCTION ROLL OF A PAPER MAKING MACHINE

FIELD OF THE INVENTION

This invention relates to paper making machines, particularly to the cylindrical suction roll of a paper making machine which has seal strips internally applied to its porous cylindrical surface for forming a zone of low pressure that extracts liquid from the work product.

BACKGROUND OF THE INVENTION

In the production of paper, trees and other natural items formed of cellulose are ground up and formed in a pulp slurry, and the slurry which is formed with water and other chemicals is moved through a continuous process of extracting the liquid from the pulp, pressing, drying and calendering the pulp until it is in the form of sheet material, and the sheet material is rolled into a spiral reel for later use.

During the liquid extraction stage of the paper making process, the slurry is fed onto a suction roll which typically is from 10 to 33 feet long that draws the liquid out of the slurry while an adjacent roll forms a nip with the suction roll that squeezes liquid out of the work product. The suction roll includes an outer cylindrical surface formed by a foraminous shell, and the cylindrical shell rotates on its own longitudinal axis. The slurry is progressively fed to the shell, and a vacuum is drawn internally of the cylindrical shell so as to induce the liquid of the work product to pass into the shell.

In order to apply the vacuum in the right position on the shell as the shell continuously rotates, a stationary suction box is positioned immediately adjacent the inside surface of the cylindrical shell. A suction is applied to the stationary suction box, so that the work product is applied to and passes over the arc of low pressure applied by the suction box as the liquid is gently drawn from the work product into the shell, with some of the liquid passing into the suction box. The liquid that is drawn into the suction box is extracted away from the system, while the liquid that passes into but not through the shell is extracted from the shell after it moves beyond the suction box by centrifugal force applied to the liquid as a result of the continuous rotation of the cylindrical shell.

In addition, the nip roll that rotates in juxtaposition with respect to the suction roll squeezes the work product against the suction roll and a major amount of the liquid in the work product is squeezed from the work product prior to reaching the arcuate zone of low pressure applied by the suction box.

It is important that the suction box forms a seal against the interior surface of the shell about the arcuate zone of low pressure applied by the suction box. The suction box is formed with seal strips arranged in a rectangle, with the seal strips having arcuate seal surfaces that are applied to the interior arcuate surface of the shell of the suction roll. The seal strips are biased toward sliding engagement with the arcuate interior surface of the shell of the suction roll, so that a moving seal is continuously maintained in an arc abut the inner cylindrical surface of the shell. Typically, the seal strips which extend parallel to the length of the suction roll, which can be about 10 to 30 feet long, are mounted into a U-shaped stationary seal holder, and an inflatable biasing tube is positioned beneath the seal strip, between the seal strip and its holder. The tube is inflated in order to gently urge the seal strip uniformly along its length outwardly toward engagement with the cylindrical shell of the suction roll.

In order to enhance the seal formed between the seal strips and the interior surface of the suction roll, water is sprayed against the interior moving surface of the shell of the suction roll at positions upstream of the first seal strip. The water tends to not only help form the seal between the seal strips and the shell of the suction roll, but to reduce the friction applied by the continuously moving shell of the suction roll against the sealing surface of the seal strip. However, the continuous movement of the suction roll eventually wears away the seal surface of the seal strip. When this occurs, the volume of air in the flexible inflatable biasing tube positioned behind the seal strip can be increased, thereby increasing the size of the flexible tube and the space that it occupies, which results in urging the seal strip further toward the cylindrical shell of the suction roll. Therefore, the progressive wearing away of the seal surface of the seal strip is compensated for by progressively increasing the size of the tube.

Eventually, this adjustable seal system fails because of the excessive wear of the seal strips which reduces the size of the seal strips and finally the inability of the inflatable tube to inflate any farther to urge the seal strips into engagement with the shell of the suction roll.

The typical paper making system operates continuously, twenty-four hours a day, and operates over periods of time that are limited only by the durability of the equipment. It is not unusual for a paper mill to operate one of its lines continuously for more than nine months. When the equipment is finally shut down, inspection, maintenance and repair are conducted on all of the equipment so that the equipment can be placed back in service for an additional cycle of operation of possibly nine more months. The suction rolls are inspected by withdrawing the suction box of each suction roll axially of the cylindrical shell and inspecting all of its components, particularly the seal strips. Some mills have the policy of replacing the seal strips each time that the paper machine is shut down, even though the seal strips may not require replacement. Obviously, this is wasteful in that new seal strips must be purchased when they are not necessary, and the workers must spend their time in replacing and setting the new seal strips.

On the other hand, some mills rarely change the seal strips, allowing the seal strips to become excessively worn and progressively inefficient. This results in the suction roll being less efficient in extracting liquid from the work product, so that the subsequent dryer section of the paper making process must be adjusted to evaporate the additional liquid from the work product. Again, this is inefficient and expensive.

A problem with the prior art seal strips is that they sometimes wear unevenly, so that upon inspection it may be determined that one portion of a seal strip is becoming rapidly worn while other portions are experiencing normal wear. For example, if the water spray system inside the suction roll unevenly applies the water to the shell upstream of the suction box, the friction applied by the sealing strips to the shell may be uneven and cause uneven wear on the seal strip. Also, the inflatable tube may have a weakened section that applies more biasing force to a portion of a seal strip, causing uneven wear. If uneven wear of a seal strip is detected, corrective action may be taken to avoid the uneven wear.

Thus, there is a need for expediently and accurately determining when the seal strips of a suction box of a suction roll need replacement, so that the life of a seal strip can be prolonged and the seal strip used until it has become worn evenly along its length and is about to lose its sealing efficiency, without prematurely replacing it or without allowing the seal strip to become excessively worn and inefficient.

SUMMARY OF THE INVENTION

Briefly described, the present invention comprises a seal system for the cylindrical shell of a suction roll of a paper making system which includes wear indicators that alert an inspector of the system to the condition of wear of the seal strips of the seal system.

In one embodiment of the invention, inspection holes are formed through the arcuate seal surface of a seal strip, with the inspection holes being positioned at intervals along the seal strip, and colored material is filled into the holes. Typically, the color of the fill material placed deeply into the hole is red, and the color of the fill material closer to the seal surface of the seal strip is green. As the seal strip wears, the fill material will wear away along with the material of the seal strip. When the paper mill shuts down for maintenance, etc., the inspector will pull the suction box from the cylindrical shell of the suction roll and inspect the color of the fill material in each of the holes of the seal strip. If the inspector determines that the color of the fill material is green, the inspector will know that the useful life of the seal strip has not been depleted, and if the seal strip is otherwise suitable for another cycle for machine operation, the inspector will not replace the seal strip, but will reposition the used seal strip back in the suction roll for the next cycle of operation. However, should the inspector detect that the fill material exposed in the holes of the seal strip is red, the inspector will know that the remaining wear on the seal strip is not enough for another cycle of operation, and the inspector will replace the worn seal strip with a new seal strip. Multiple colors of fill material can be used at different levels within the inspection holes to provide more accurate information to the inspector. For example, yellow fill material can be placed between the red and green fill material to indicate an intermediate wear condition.

If some of the inspection holes reveal different colors from other inspection holes, the inspector will become aware of uneven wear of the seal strip and can take corrective action to equalize the wear of the seal strip during the next cycle of operation of the system.

Another embodiment of the invention utilizes slots formed in a side surface of a seal strip, with the slots extending from the arcuate seal surface of the seal strip, away from the seal strip. The slot itself being visible upon inspection provides an indication to the inspector of the amount of wear remaining in the seal strip. Optionally, colors can be applied to the slots with fill material, or with a coating of colors applied to the slots.

Yet another embodiment of the invention includes indicia, such as a scale with numbers applied at intervals along the seal strip, with each scale extending away from the arcuate seal surface of the seal strip, so that an inspection of the scales indicates the amount of wear left in the seal strip.

Another embodiment of the invention is the placement of insulated electrical conductors at intervals along the seal strip, with the conductors being oriented so that as the seal strip wears away, the insulation about the conductors will wear away until the electrical conductors make contact with the liquid of the system. This is used to ground the electrical conductors, so as to complete an electrical circuit that is used to provide a visual indication of a condition of wear of the seal strip.

Thus, it is an object of this invention to provide an improved suction box for placement inside the inner cylindrical surface of a rotary suction roll of a paper-making system which includes seal strips having wear indicators that enable an inspector of the suction box to easily determine the rate of wear of the seal strips, the amount of material remaining in the seal strips and any uneven wear experienced by the seal strips of the suction box.

Another object of this invention is to provide an improved elongated seal strip for a suction box of a suction roll of a paper-making machine, with the seal strip including wear indicators extending along its length which provide an indication of how much of the arcuate sealing surface of the seal strip remains at intervals along the seal strip.

Another object of this invention is to provide a sealing strip for a suction box of the type described which has wear indicators that correspond in magnitude to the greatest amplitude of expansion of the inflatable tube which biases the sealing strip into sealing engagement with the suction roll.

Other objects, features and advantages of the present invention will become apparent upon reading the following specification, when taken in conjunction with the accompanying drawings.

BRIEF DESCRIPTION OF THE DRAWINGS

FIG. 1 is a schematic illustration of a typical paper mill.

FIG. 2 is a partial view of a compression roll and a suction roll and its suction box which embodies the present invention.

DETAILED DESCRIPTION

Figure 3:
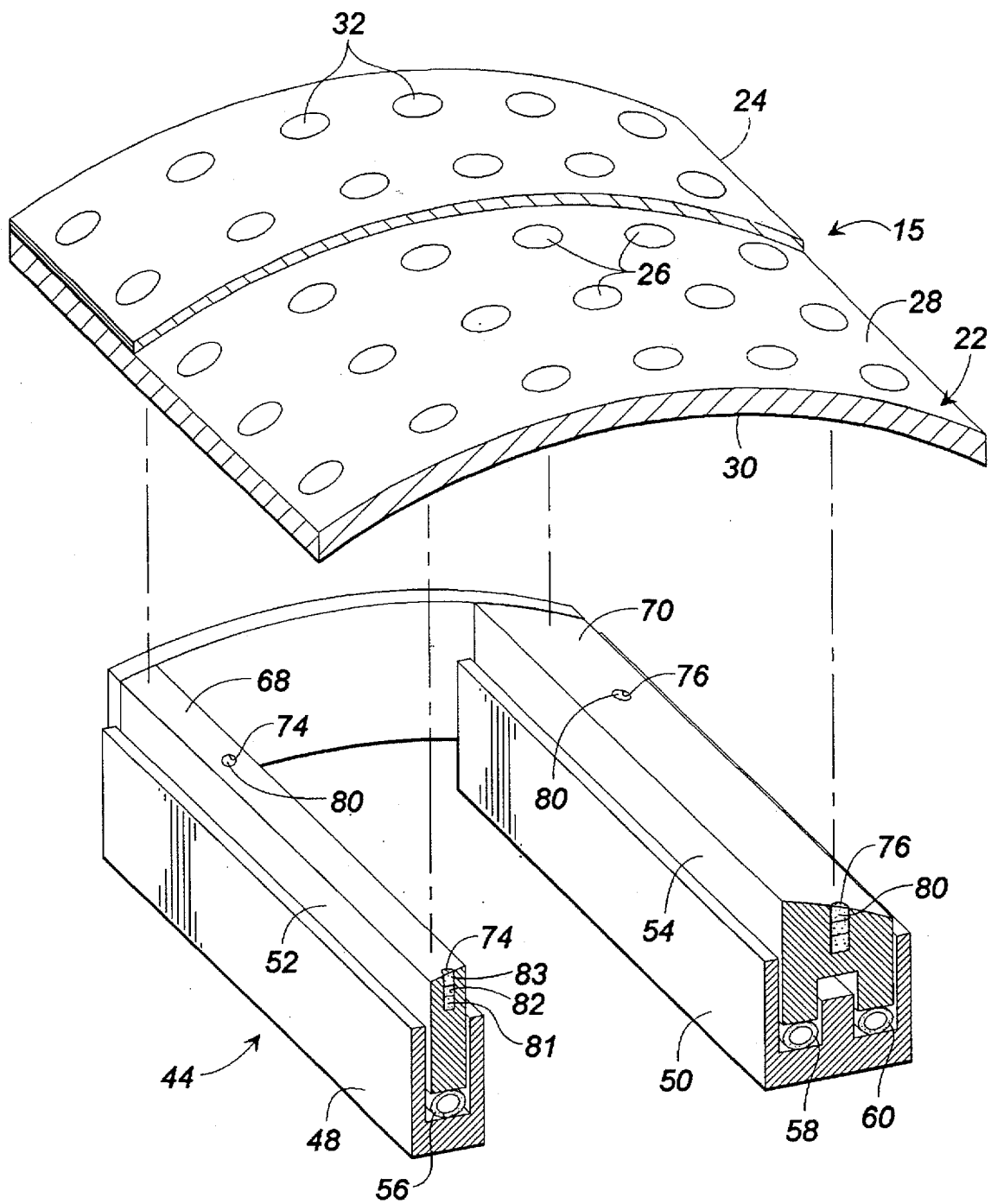
FIG. 3 is an exploded view of an end portion of a suction box, showing the seal strips spaced from the facing surfaces of the rotary shell and its rubber cover of the suction roll.

Referring now in more detail to the drawings, in which like numerals indicate like parts throughout the several views, FIG. 1 illustrates a typical paper mill 10 that converts a slurry of cellulosic pulp into sheet material accumulated on a reel. The paper mill includes a head box 11 that delivers a slurry that includes cellulosic pulp to the Fourdrinier table 12. The slurry, after passing through the Fourdrinier table moves through a press section 14 where the slurry is compressed between suction roll assemblies 15 and compression rolls 16. The slurry, being substantially dewatered in the press section, then moves through a dryer section 18 where heat is used to evaporate the liquid from the work product, and then finally through a calender stack 19, and is then accumulated in spiral form on a reel 20. This is conventional in the art.

As illustrated in FIGS. 2 and 3, the suction roll assembly 15 of the system includes a cylindrical, foraminous stainless steel or bronze suction roll shell 22, and a foraminous rubber cover 24. The shell 22 has an array of holes 26 formed therein, with the holes extending through the suction roll from its outside cylindrical surface 28 to its inside cylindrical surface 30. Typically, the thickness of the cylindrical metal sheet that forms the suction roll 22 is from 1–2 inches, with the diameter of the suction roll being approximately 2 to 5 feet and its axial length being approximately 10 to 30 feet. The holes 26 are formed in a uniform array and of uniform size, with about 100,000 to 400,000 holes being formed in the shell of a typical suction roll.

The porous cover 24 is compressible, and includes its own array of holes 32 which usually are aligned with the holes of the shell. The holes 32 of cover 24 and the holes 26 of suction roll 22 provide a passage for liquid to move from the outside to the inside of the suction roll assembly.

The compression roll 16 (FIGS. 1 and 2) is positioned so as to engage the suction roll assembly 15 during normal operation. The slurry or work product 36 is applied to the suction roll 22 and moves in the direction indicated by arrow 38 with the movement of the suction roll assembly 15 toward the nip 40 formed between the suction roll assembly and the compression roll 16. The compressible cover 24 is compressed by the movement of the slurry 36 through the nip 40, thereby squeezing the slurry 36 and forcing about 60% of the water out of the slurry. A backwash 42 of the liquid squeezed from the slurry does not pass through the nip 40 between the suction roll assembly 15 and the compression roll 16, but simply is squeezed back in the direction of the oncoming slurry 36. The slurry, in the meantime, passes through the nip 40. The compression applied to the work product 36 by the compression roll 16 also urges liquid into and through the holes 32 of cover 24 and the holes 26 of the cylindrical shell 22.

In the meantime, a suction, or a zone of reduced pressure, is applied by the suction box 44 that is located internally of the suction roll 22. As illustrated in FIG. 2, the suction box 44 includes partition 46 and seal strip supports 48 and 50 which straddle partition 46. Seal strips 52 and 54 are received in the seal strip supports 48 and 50, and are arranged to engage the inner cylindrical surface 30 of the suction roll 22. Inflatable biasing tubes 56, 58 and 60 are positioned behind the seal strips 52 and 54, and are arranged to bias the seal strips outwardly of the seal strip supports 48 and 50 toward engagement with the inside arcuate surface 30 of the suction roll 22. An opening 62 is formed in the partition 46 of the suction box 44, and the inlet of a compressor 64 communicates with the opening 62, so as to induce a zone of low pressure in the suction box, so that the stationary suction box applies an arc of low pressure 66 to the facing moving arcuate surface of the suction roll 22, between the seal strips 52 and 54.

The difference in the pressure from outside of the suction roll 22 to the arc of low pressure 66 induces liquid to move from the work product into the holes 32 of the rubber cover 24 and the holes 26 of the suction roll 22, with some of the liquid passing into the suction box 44. This extracts a significant percentage of the liquid from the work product as the work product passes through the nip 40 between the adjacent rolls.

As illustrated in. FIG. 3, the surfaces 68 and 70 of the seal strips 52 and 54 are arcuate, and formed on a radius substantially equal to the radius of the curvature of the inside surface 30 of the suction roll 22. The arcuate shapes of the seal surfaces 68 and 70 of the seal strips 52 and 54 therefore make substantially flat sliding contact with the inside surface 30 of the suction roll 22, helping to form a seal about the arcuate zone of reduced pressure 66.

The inflatable biasing tubes 56, 58 and 60 urge the seal strips 52 and 54 toward the inside arcuate surface 30 of the suction roll 22, and as the arcuate seal surfaces 68 and 70 progressively wear away, the volume of fluid inside the biasing tubes 56, 58 and 60 is increased, causing the seal strips to move further outwardly toward engagement with the suction roll. With this arrangement, the biasing tubes 56–60 compensate for the wear of the sealing surfaces 68 and 70 of the seal strips.

In order to detect the amount of seal material remaining in the seal strips 52 and 54, bores 74 and 76 are formed in the seal strips 52 and 54, respectively, with the bores extending from the arcuate seal surfaces 68 and 70 inwardly of the seal strips. The bores 74 and 76 are spaced along the lengths of the seal strips, with, for example, 5 bores being formed along the length of a 30 foot seal strip. For example, one bore 74 or 76 would be positioned at the center of its seal strip, and two bores would be positioned between the center bore and each end of the seal strip. The bores 74 and 76 are filled with colored fill material. The fill material is a non-abrasive chemical resistant solid material such as polyurethane or other plastic material. The coloring material is, for example, inorganic paste pigment. The color of the fill material contrasts with the color of the seal strip. As the seal surface 68 or 70 of a seal strip wears away, the colored fill material in the bore 74 and 76 will remain visible.

The depths of the fill materials in bores 74 and 76 correspond to the amplitude of movement of the seal strips, between the flattened configuration of its expandable biasing tube 56–60 to the fully inflated condition of the biasing tube.

Figure 4:
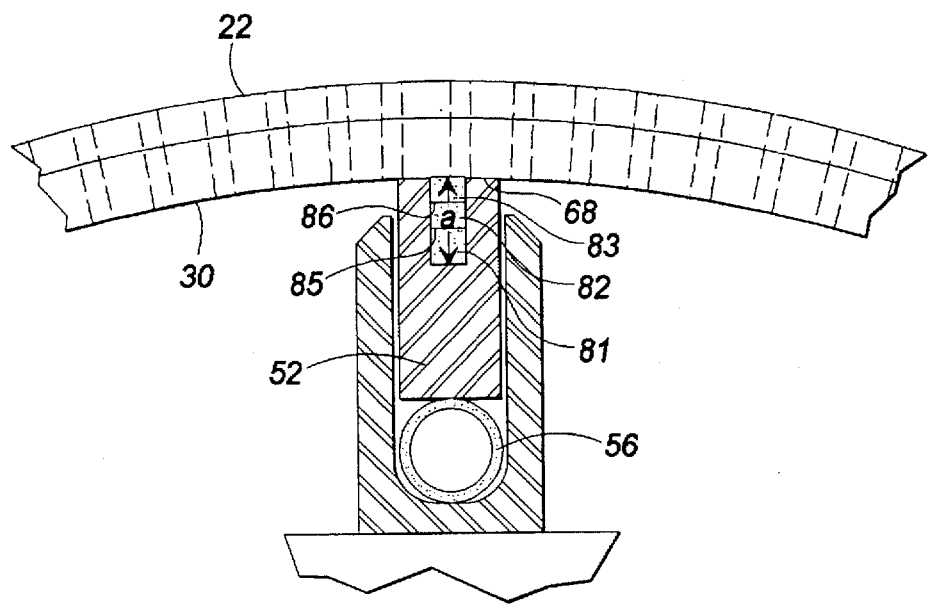
FIG. 4 is an end cross-sectional view of a seal strip of FIG. 3 which has not experienced any wear.
Figure 5:
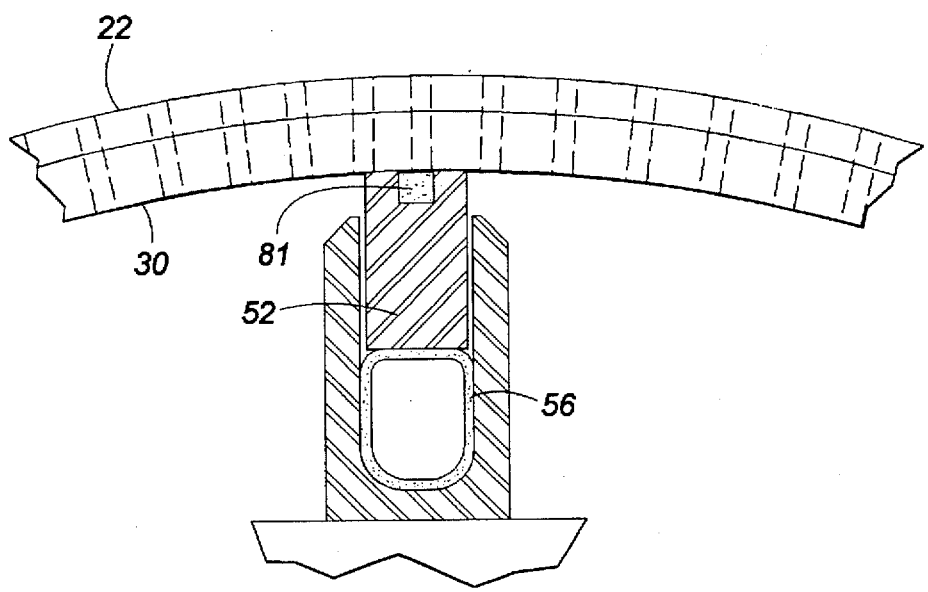
FIG. 5 is an end cross-sectional view of a seal strip, similar to FIG. 4, but showing how the seal strip has been worn away after prolonged use.

As illustrated in FIG. 4, when a new seal strip 52 is placed in a seal strip support 48 or 50, the inflatable biasing tube 56 usually is filled with air and is round but not stretched to an inflated condition, being inflated only to that extent necessary to urge the seal strip 52 outwardly so that its seal surface 68 engages the inside arcuate surface 30 of the suction roll 22, with enough pressure of the fluid in the biasing tube 56 to lift the seal strip into continuous abutment along its full length with the suction roll. The fill material in the embodiment of FIGS. 4 and 5 is of three distinct colors, with the fill material 81 being of the color red, the fill material 82 being of the color yellow, and the fill material 83 being of the color green. The red fill material 81 extends from the deepest portion of the bore to the first level 85, and the yellow fill material extends from the first level 85 to the second level 86, while the green fill material 83 extends from the second level 86 to a level coextensive with the arcuate seal surface 68 of the seal strip. The distance from the arcuate seal surface 68 to the first level 85, which extends through all of the green fill material 83 and all of the yellow fill material 82 is equal to the distance that the inflatable biasing tube 56 can push the seal strip 52 from its inward seated position as shown in FIG. 4, when it is new, to its most outward seated position, as shown in FIG. 5, when the seal strip is substantially worn out. Thus, the distance A represents the useful life or full wear of the seal strip as well as the difference between the collapsed seated position of the seal strip in FIG. 4 to the extended position of FIG. 5.

When the mill is shut down for maintenance and the suction box 44 is removed for inspection, the inspector can determine the amount of wear of the seal strip 52 by observing the colors of the fill materials 80 in the bores 74. If the inspector detects that the color of the fill material 80 is green, the inspector will know that a substantial amount of seal material of the seal strip remains. However, should the inspector detect that the color yellow of the fill material 82 is showing in some or all of the bores 74, the inspector will know that only a small amount of wear material remains in the seal strip. Further, should the inspector detect the color red of the fill material, the inspector will know that the entire useful life of the seal strip has been used up and that there is no seal material remaining that could reach and engage the inner arcuate surface 30 of the suction roll when the inflatable biasing tube 56 is fully inflated, as shown in FIG. 5.

The inspector might encounter a situation where some of the inspection bores 74 show different colors. For example, the inspector might detect that one of the inspection bores 74 shows the color yellow, while the others show the color green. This alerts the inspector to the likelihood that the seal strip is wearing unevenly. The inspector then has the option to take corrective steps so as to attempt to cause the seal strip to wear evenly. For example, the inspector may adjust the nozzle 90 (FIG. 2) so as to direct the spray of water against the inside surface of the suction roll, to apply more water to the suction roll in the vicinity of the inspection bore 74 that shows the color yellow.

Figure 6:
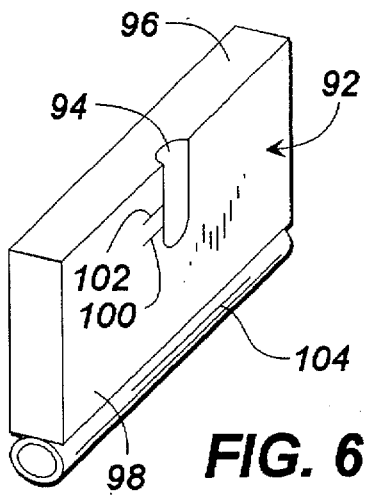
FIG. 6 is perspective illustration of a small portion of a seal strip of FIGS. 2 and 3, showing an alternate embodiment of the invention.

FIG. 6 shows a segment of an alternate seal strip structure, which includes, instead of bores such as bores 74 and 76 of FIG. 3, slots 94 which are spaced at intervals along the length of the seal strip. Each slot 94 is an elongated recess that extends from the arcuate seal surface 96 into a side surface 98 of the seal strip. The concave surface of the slot 94 is not filled with colored fill material; however, indicator marks 100 and 102 are formed in the surface of the side 98 of the seal strip. The first mark 100 corresponds to the distance from the seal surface 96 that is equal to the maximum amplitude of inflation of the expandable biasing tube 104 from the initial round configuration of FIG. 4 to the expanded configuration as shown in FIG. 5. The second mark 102 indicates a distance from the seal surface 96 where so much seal material has been worn away that it is time to change the seal strip.

Figure 7:
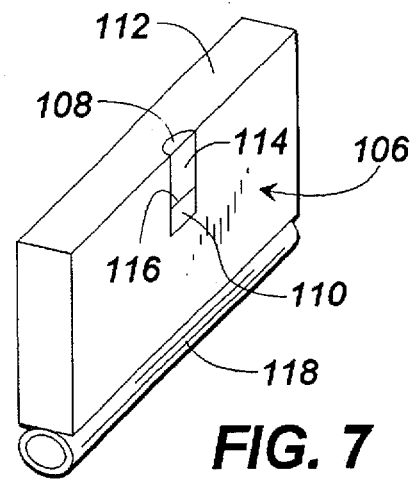
FIGS. 7-11 are perspective illustrations of segments of seal strips, similar to FIG. 4, but showing other embodiments of the invention.

FIG. 7 shows another embodiment of a seal strip 106 which includes, instead of a bore or an unfilled slot, a filled slot 108. The fill material includes two or more colors, with a red color 110 positioned remotely from the seal surface 112 and a green color fill material 114 adjacent the seal surface. The intersection 116 between the red fill material and the green fill material is at a distance from the seal surface 112 which corresponds to the amplitude of inflation of the biasing tube 118 from its initial round configuration when the new seal strip is inserted into the system to its fully inflated configuration after the seal surface 112 has been worn away.

Figure 8:
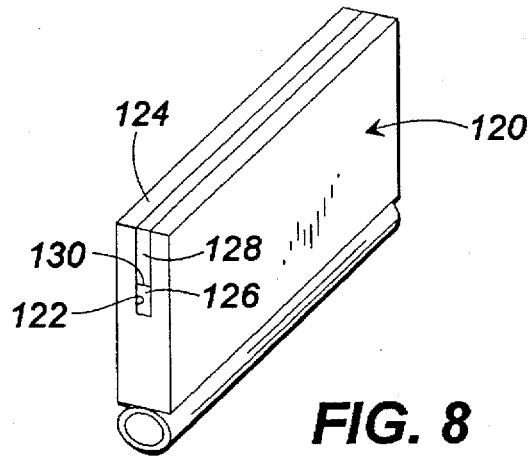

FIG. 8 shows another embodiment of the seal strip 120, which includes an edge slot 122 that intersects the seal surface 124 and extends inwardly of the seal strip. Fill material is filled into the edge slot 122, with red fill material 126 placed deep into the slot and green fill material 128 adjacent the seal surface 124. The intersection 130 between the red and green fill material indicates the amplitude of expansion of the expandable biasing tube 132 between its initial round configuration when the new seal strip 120 is inserted into place in the suction box and in engagement with the suction roll to its fully expanded configuration. When the red fill material 126 is visible, the useful life of the seal strip 120 has expired.

Figure 9:
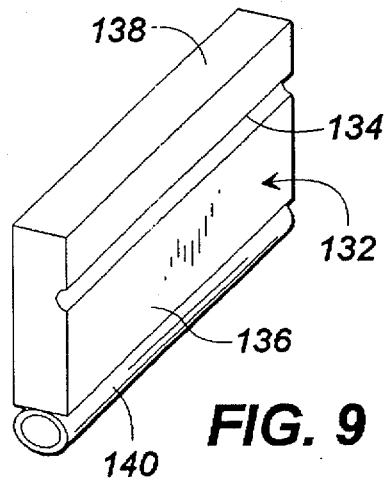

FIG. 9 shows another embodiment of the seal strip 132, which includes a longitudinal groove 134 formed on the sidewall 136 of the seal strip. The longitudinal groove 134 is parallel to the seal surface 138 and is displaced from the seal surface a distance that corresponds to the amplitude of expansion of the expandable biasing tube 140.

Figure 10:
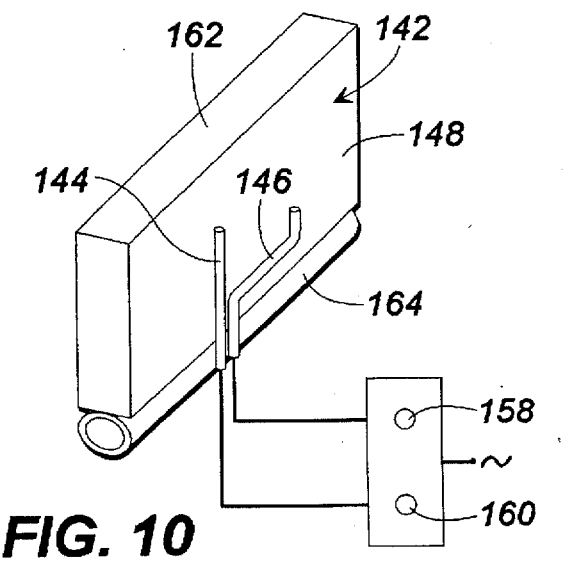

FIG. 10 shows another embodiment of the seal strip, with the seal strip 142 having insulated electrical conductors 144 and 146 applied to its side surface 148, or placed inside seal strip (not shown). The electrical conductors are connected to signal lights 158 and 160, and a source of electricity. When the insulation wears away from the conductors 144 and 146, a circuit is made through the signal lamps 158 and 160 by means of the source of electricity and by the water that comes in contact with the electrical conductors, causing the signal lamps 158 and/or 160 to illuminate. It will be noted that one of the electrical conductors 144 has its terminal end closer to the seal surface 162 of the seal strip 142 than the other conductor, and the end of the conductor 144 is spaced from the seal surface a distance that corresponds to the amplitude of expansion of the expandable biasing tube 164 from its initial round configuration to its fully inflated configuration. The staggered placement of the conductors corresponds to the positions of the yellow and red levels of fill material described above.

Figure 11:
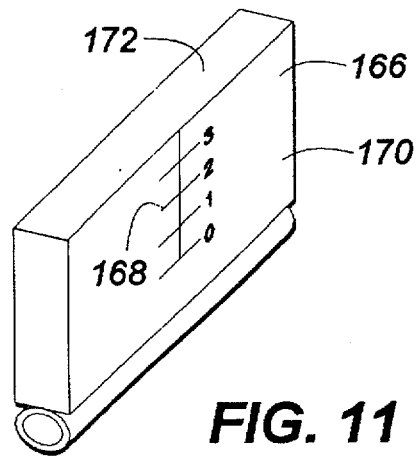

FIG. 11 is yet another embodiment of the seal strip, with the seal strip 166 having a scale applied to its side surface 170. The scale extends from the seal surface 172 and provides a visual indication of the amount of seal material remaining in the seal strip as the seal strip wears away.

While the present invention has been described in detail with respect to preferred embodiments, it will be understood by those skilled in the art that numerous modifications, additions and deletions can be made thereto without departing from the spirit and scope of the invention as set forth in the following claims.

I claim:

1. In a suction roll assembly of a paper making machine which includes a cylindrical shell rotatable about its longitudinal axis for receiving a slurry, and a vacuum system for applying a vacuum internally of said cylindrical shell and drawing liquid from the slurry and from the outside to the inside of said cylindrical shell, the improvement therein of:

a suction box juxtaposed the inside surface of said cylindrical shell for applying the vacuum to an arc of said cylindrical shell, said suction box including seal strips having seal surfaces facing the inside surface of said cylindrical shell for engaging said cylindrical shell biasing means engaging said seal strips for urging the seal surfaces of said seal strips toward engagement with the inside surface of said cylindrical shell a predetermined distance;

wear indicators carried by said seal strips at intervals along the seal strips, said wear indicators comprising a series of holes spaced along said seal strips and formed through the seal surfaces of and into said seal strips, the depth of said holes corresponding to the predetermined distance that said biasing means can urge said seal strip toward the cylindrical surface of said cylindrical shell.

2. The invention of claim 1 and wherein said holes are filled with a fill material of a color different than the color of said seal strip.

3. The invention of claim 2 and wherein said fill material in each hole of the seal strip is of one color adjacent the seal surface of said seal strip and another color away from the seal surface of said seal strip.

4. The invention of claim 2 and wherein said fill material in each hole of the seal strip is of a first color adjacent the arcuate surface of said seal strip, a second color away from the arcuate surface of said seal surface, and a third color intermediate the first and second color.

5. In a suction roll assembly of a paper making machine which includes a cylindrical shell rotatable about its longitudinal axis for receiving a slurry, and a vacuum system for applying a vacuum internally of said cylindrical shell and drawing liquid from the slurry and from the outside to the inside of said cylindrical shell, the improvement therein of a suction box juxtaposed the inside surface of said cylindrical shell for applying the vacuum to an arc of said cylindrical shell, said suction box including seal strips having seal surfaces for facing the inside surface of said cylindrical shell and for engaging said cylindrical shell, biasing means for urging the seal surfaces of said seal strips toward engagement with the inside surface of said cylindrical shell a predetermined distance; and wear indicators comprising a series of slots formed at intervals along said seal strips and formed through and extending away from the seal surfaces of said seal strips a distance corresponding to the predetermined distance that said biasing means can urge said seal strips toward the cylindrical surface of said cylindrical shell.

6. The invention of claim 5 and wherein said slots are filled with a fill material of a color different than the color of said seal strip.

7. The invention of claim 6 and wherein the fill material of said slots is of one color adjacent the seal surface of said seal strip and another color away from the arcuate seal surface of said seal strip.

8. A suction box for placement inside the inner cylindrical surface of a rotary suction roll of a paper making system comprising:

a stationary support frame for positioning inside a rotary suction roll;

rectilinear seal strips movably supported by said support frame for placement inside a suction roll for engaging the inside cylindrical surface of a suction roll;

said seal strips each including a seal surface for sealing against the inside cylindrical surface of said suction roll;

biasing means for urging said seal surfaces of said seal strips toward engagement with the suction roll; and at least some of said seal strips including wear indicators formed in said seal strip and positioned at intervals along the length of the seal strip and extending from the seal surface of said seal strip a distance corresponding to the maximum wear to be experienced by the seal surface of the seal strip;

so that the wear indicators become progressively worn away with the wearing away of the seal surface and indicate the wear of the seal surface at intervals along the seal strip.

* * * * *